US008176635B2

(12) United States Patent
Queheillalt et al.

(10) Patent No.: US 8,176,635 B2
(45) Date of Patent: May 15, 2012

(54) MANUFACTURE OF LATTICE TRUSS STRUCTURES FROM MONOLITHIC MATERIALS

(75) Inventors: Douglas T. Queheillalt, Charlottesville, VA (US); Haydn N. G. Wadley, Keswick, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 111 days.

(21) Appl. No.: 12/447,166

(22) PCT Filed: Oct. 26, 2007

(86) PCT No.: PCT/US2007/022733
§ 371 (c)(1),
(2), (4) Date: Apr. 24, 2009

(87) PCT Pub. No.: WO2008/127301
PCT Pub. Date: Oct. 23, 2008

(65) Prior Publication Data
US 2009/0282773 A1     Nov. 19, 2009

Related U.S. Application Data

(60) Provisional application No. 60/855,089, filed on Oct. 27, 2006, provisional application No. 60/963,790, filed on Aug. 7, 2007.

(51) Int. Cl.
*B21D 47/00* (2006.01)

(52) U.S. Cl. ... 29/897.31; 29/987; 29/987.3; 29/897.32; 29/897.312; 29/897.35; 52/633; 52/634; 52/636

(58) Field of Classification Search ............ 52/633–638, 52/693, 696, 643, 655.1, 646, 745.2, 651.11, 52/645; 29/897, 897.3, 897.31, 897.312, 29/897.35, 525.01, 557, 558, 840.046, 840.05, 29/846.6
See application file for complete search history.

(56) References Cited

U.S. PATENT DOCUMENTS

| 5,419,041 | A | * | 5/1995 | Ozeki | 29/890.03 |
|---|---|---|---|---|---|
| 5,690,035 | A | * | 11/1997 | Hatayama et al. | 105/452 |
| 5,937,518 | A | * | 8/1999 | Steiner | 29/890.03 |
| 6,537,682 | B2 | * | 3/2003 | Colligan | 428/593 |

* cited by examiner

*Primary Examiner* — William Gilbert
*Assistant Examiner* — Patrick Maestri
(74) *Attorney, Agent, or Firm* — Novak Druce DeLuca + Quigg LLP

(57) ABSTRACT

Methods and systems to manufacture lattice-based sandwich structures from monolithic material. Such methods and systems eliminate the bonding process which is conventionally used to join lattice based truss cores to facesheets to form sandwich structures. This bonded interface is a key mode of failure for sandwich structures which are subjected to shear or bending loads because the nodes transfer forces from the face sheets to the core members while the topology for a given core relative density dictates the load carrying capacity (assuming adequate node-bond strength exists). An aspect comprises a core and related structures that provide very low density, good crush resistance and high in-plane shear resistance. An aspect of the truss structures may include sandwich panel cores and lattice truss topology that may be designed to efficiently support panel bending loads while maintaining an open topology that facilitates multifunctional applications.

44 Claims, 12 Drawing Sheets

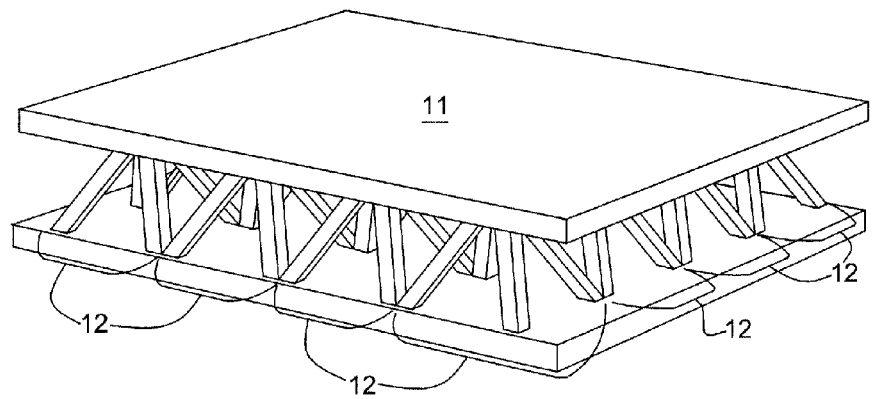
FIG. 7
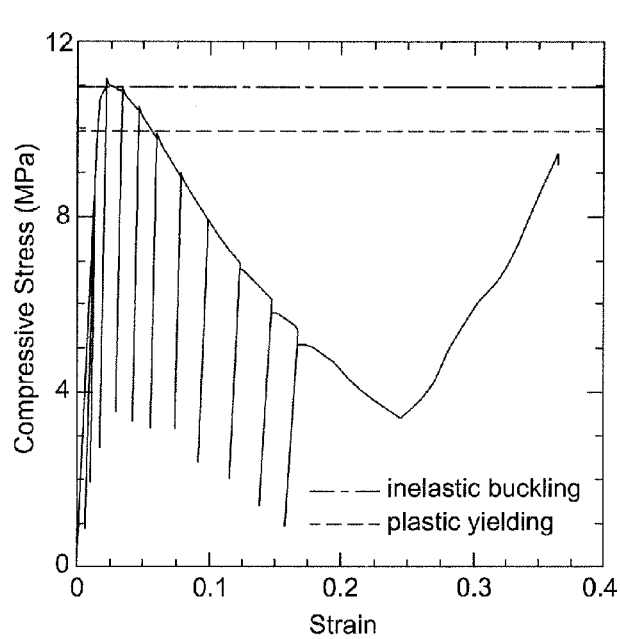
FIG. 8A
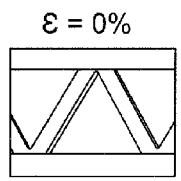
FIG. 8B
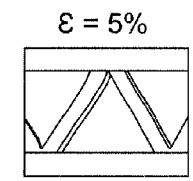
FIG. 8C
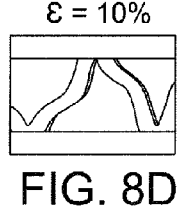
FIG. 8D
FIG. 8E
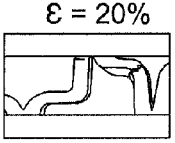
FIG. 8F
FIG. 8G

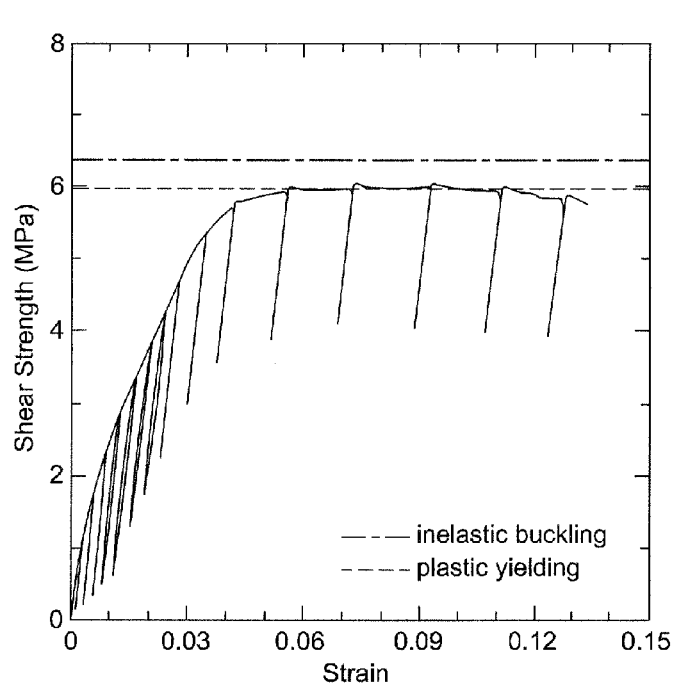
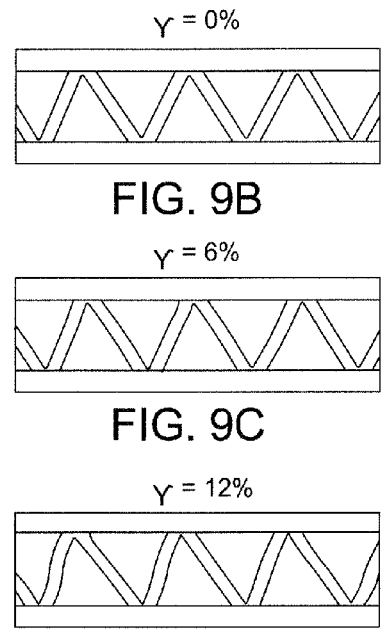
FIG. 9B
FIG. 9C
FIG. 9D
FIG. 9A
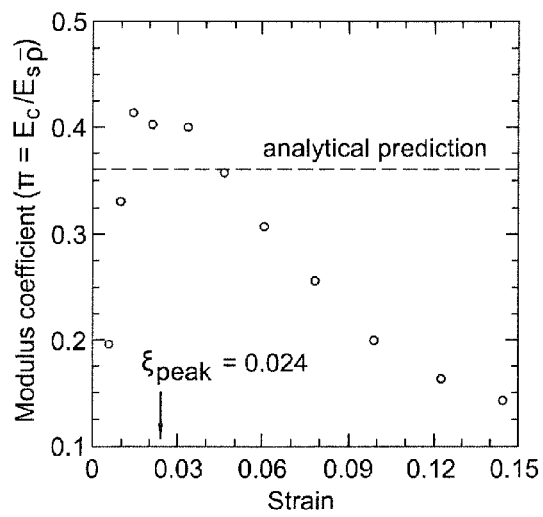
FIG. 10A
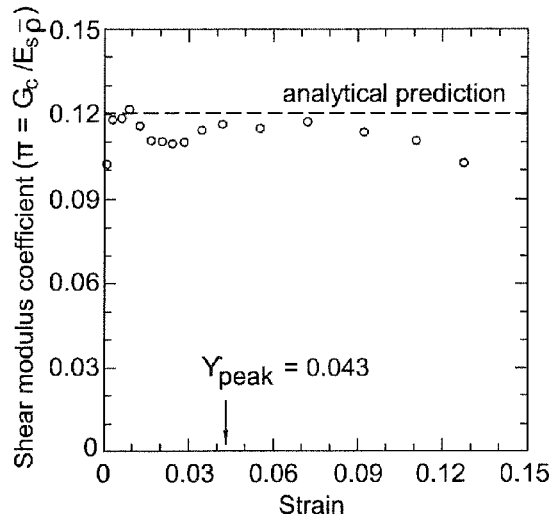
FIG. 10B fractured nodes

MANUFACTURE OF LATTICE TRUSS STRUCTURES FROM MONOLITHIC MATERIALS

RELATED APPLICATIONS

The present invention is a national stage filing of International Application No. PCT/US2007/022733, filed Oct. 26, 2007, which claims priority from U.S. Provisional Application Ser. No. 60/855,089 filed Oct. 27, 2006, entitled "Manufacture of Lattice Truss Sandwich Structures from Monolithic Materials" and U.S. Provisional Application Ser. No. 60/963,790 filed Aug. 7, 2007, entitled "Manufacture of Lattice Truss Sandwich Structures from Monolithic Materials" the disclosures of which are hereby incorporated by reference herein in their entirety.

GOVERNMENT SUPPORT

Work described herein was supported by Federal Grant No. ONR Grant No. N00014-01-1-1051, awarded by Office of Naval Research. The Government has certain rights in the invention.

BACKGROUND OF THE INVENTION

Lightweight sandwich panel structures consisting of low density cores and solid facesheets are widely used in engineering applications. Cellular core structures based upon honeycomb topologies are often used because of their high compressive strength-to-weight ratios and high bending stiffness. These honeycomb structures are close-celled with limited access into the core regions. The cores may be attached to the facesheets or plates by conventional joining methods, such as adhesive bonding, brazing, diffusion bonding and welding. Recently, lattice truss structures have been explored as an alternate cellular core topology. Pyramidal lattice truss structures are usually fabricated from high ductility alloys by folding a perforated metal sheet along the perforations, creating accordion-like structures. Conventional joining methods such as brazing or laser welding are then used to bond the core to solid facesheets, forming sandwich structures. The lattice topology, core relative density, and parent alloy mechanical properties, along with the bond strengths, determine the mode of truss deformation and, therefore, the out-of-plane and in-plane mechanical properties of these structures.

The design of the core-facesheet node interface is of the utmost importance. Ultimately, this dictates the maximum load that can be transferred from the facesheets to the core. Node bond failure has been identified as a failure mode for sandwich structures, especially metallic honeycombs. However, analogous node failure modes have been observed in sandwich panels utilizing tetragonal and pyramidal lattice truss cores during shear loading. Assuming sufficient core-faceplate bond (facesheet-bond) strength and ductility, when sandwich panels are subjected to intense shear or bending loads, the nodes transfer forces from the facesheets to the core members and the topology for a given core relative density dictates the load carrying capacity. When the node-facesheet interfacial strength is compromised by poor joint design or inadequate bonding methods, node bond failure occurs resulting in premature failure of the sandwich panel. Numerous factors determine the robustness of nodes, including joint composition, microstructure, degree of porosity, geometric effects (which control stress concentrations) and the nodes' contact area.

Micromechanical models for the stiffness and strength of pyramidal lattice truss cores, comprising elastic-plastic struts with perfect nodes have been recently developed. These models assumed that the trusses are connected to rigid face sheets and are of sufficiently low aspect ratio that bending effects make a negligible contribution to the stiffness and strength. These micromechanical models also assume the node strength is the same as the parent metal alloy. However, the measured elastic moduli rarely reach the predicted values because of variations in the length of the trusses and small initial departures from straightness introduced by manufacturing processes.

The design of the core-to-facesheet interface in honeycomb sandwich panels is of utmost importance. Ultimately, this dictates the amount of load that can be transferred from the face sheets to the core. This is even more critical for lattice-based cores since they can have a smaller node area than honeycombs of the same core density. Node bond failure has been identified as a key catastrophic failure mode for metallic honeycomb sandwich structures (See Bitzer, 1997). Similar node robustness problems have been observed in lattice-based sandwich structures. When sandwich panels are subjected to shear or bending loads, the nodes transfer forces from the facesheets to the core, assuming adequate node bond strength exists, and the topology for a given core relative density dictates the load carrying capacity. When the core-facesheet interface strength is compromised by poor joint design or weak bonding methods, node failure occurs and catastrophic failure of the sandwich panel results. Although numerous factors (including joint composition, microstructure, degree of porosity, and geometric constraints) determine the robustness of nodes, the node contact area serves as a critical limiting factor in determining the maximum force that can be transmitted across the core-facesheet interface.

Initial efforts to fabricate millimeter scale structures employed investment casting of high fluidity casting alloys such as copper/beryllium (See Wang et al., 2003), aluminum/silicon (See Deshpande et al., 2001, Deshpande and Fleck, 2001, Wallach and Gibson, 2001, Zhou et al., 2004), and silicon brass (See Deshpande and Fleck, 2001). Investment casting begins with the creation of a wax or polymer pattern of the lattice truss sandwich structure. The sandwich structure is attached to a system of liquid metal gates, runners, and risers that are made from a casting wax. The whole assembly is coated with ceramic casting slurry. The pattern is then removed and the empty (negative) pattern filled with liquid metal. After solidification, the ceramic, gates, and runners are removed, leaving behind a lattice based sandwich structure of homogeneous metal. However, the tortuosity of the lattices made it difficult to fabricate high-quality investment-cast structures at the low relative density (2-10%) needed to optimize sandwich panel constructions (See Chiras et al., 2002). In addition, the inherent low quality of as-cast metals resulted in sandwich structures that lacked the robustness required for the most demanding structural applications (See Sugimura, 2004).

The toughness of many wrought engineering alloys is evidenced by development of alternative fabrication approaches based upon perforated metal sheet folding (See Sypeck and Wadley, 2002). These folded truss structures could be bonded to each other or to facesheets by either transient liquid phase (TLP) bonding or micro welding techniques to form lattice-truss sandwich panels. Panels fabricated with tetrahedral (See Sypeck and Wadley, 2002, Rathbun et al., 2004, Lim and Kang, 2006) and pyramidal lattice-truss (See Zok et al., 2004, Queheillalt and Wadley, 2005, McShane et al., 2006, Radford, et al. 2006) topologies have been made by the folding and brazing/TLP bonding method. However, the node bond strength and the topology for a given core relative density may dictate the load-carrying capacity. While these structures are much more robust than their investment cast counterparts, their robustness may be dictated by the quality of the bond between the core and facesheets.

A detailed description of the fabrication approach for making 6061 aluminum alloy lattice truss structures can be found in Multifunctional Periodic Cellular Solids and the Method of Making the Same (PCT/US02/17942, filed Jun. 6, 2002), Method for Manufacture of Periodic Cellular Structure and Resulting Periodic Cellular Structure (PCT/US03/16844, filed May 29, 2003), and Methods for Manufacture of Multilayered Multifunctional Truss Structures and Related Structures there from (PCT/US2004/004608, filed Feb. 17, 2004), of which all of the PCT Applications are hereby incorporated by reference herein in their entirety. Briefly, these patents describe a folding process used to bend perforated sheets to create a single or multiple-layered lattice truss structures. The folding is accomplished using a paired punch and die tool or a finger break to fold node rows into the desired truss structure. The lattice truss core is then joined to facesheets via one of the previously mentioned methods to form the lattice truss sandwich structure (i.e. adhesives, welding, brazing, soldering, transient liquid phase sintering, etc.).

SUMMARY OF INVENTION

Provided herein are exemplary methods and systems to manufacture lattice-based sandwich structures from monolithic material. Such methods and systems eliminate the bonding process which is conventionally used to join lattice based truss cores to facesheets to form sandwich structures. This bonded interface is a key mode of failure for sandwich structures which are subjected to shear or bending loads because the nodes transfer forces from the face sheets to the core members while the topology for a given core relative density dictates the load carrying capacity (assuming adequate node-bond strength exists).

An aspect of an embodiment of the present invention comprises a core and related structures that provide very low density, good crush resistance and high in-plane shear resistance. An aspect of the truss structures may include sandwich panel cores and lattice truss topology that may be designed to efficiently support panel bending loads while maintaining an open topology that facilitates multifunctional applications.

Some aspects of various embodiments of the present invention method and system utilize, but are not limited to, novel methodologies to construct sandwich structures without using adhesives, diffusion bonding, brazing, soldering, or resistance/electron/laser welding or coupling to join the cores to the facesheets to form sandwich structures. Facesheet-core interface bond failure (e.g., facesheet-core interface) may be a key failure mode for lattice based sandwich structures. When lattice based sandwich panels are subjected to shear or bending loads, the nodes transfer forces from the face sheets to the core members (assuming adequate node bond strength exists) and the topology (for a given core relative density) dictates the load carrying capacity. However, when the node-facesheet interface strength is compromised, node failure occurs and catastrophic failure of the sandwich panel results.

Some aspects of various embodiments of the present invention method and system may utilize, but are not limited thereto, a two-step manufacturing process. A prismatic structure is extruded forming a 3D structure with a constant cross section along the path of extrusion; thereafter a secondary operation is used to selectively remove material, from the core region, forming a 3D lattice truss sandwich structure. This process can be used for any metal, including (but not limited thereto) steel, aluminum, copper, magnesium, nickel, titanium alloys, etc., and is highly suited for alloys that possess limited ambient temperature ductility.

It should be appreciated that the method of manufacture/fabrication may be altered or adjusted in interest of creating a resultant structure that is ultimately desired or required.

An aspect of an embodiment of the present invention provides a method of creating a monolithic lattice truss or truss-based structure (or related structure as desired or required). The method comprising: providing a monolithic sample; extruding the monolithic sample to selectively remove material along a first path; and machining the monolithic sample to selectively remove material along a second path, wherein the first path and the second path are offset at a desired offset angle to create one or a plurality of truss unit portions. Multiple paths and various types of paths and respective locations and angles may be applied as desired or required to achieve the desired method or structure.

An aspect of an embodiment of the present invention provides a method of creating a monolithic lattice truss structure (or related structure as desired or required). The method comprising: providing a monolithic sample; machining the monolithic sample to selectively remove material along a first path; and machining the monolithic sample to selectively remove material along a second path, wherein the first path and the second path are offset at a desired offset angle to create one or a plurality of truss unit portions. Multiple paths and various types of paths and respective locations and angles may be applied as desired or required to achieve the desired method or structure.

An aspect of an embodiment of the present invention provides a monolithic lattice truss structure (or related structure as desired or required). The structure comprising: one or a plurality of truss unit portions, wherein the truss unit portions have the same metallurgical and microstructural properties.

An aspect of an embodiment of the present invention provides a structure that is manufactured or fabricated in whole or in part and by any one or combination of the manufacturing or fabrication methods discussed herein.

These and other objects, along with advantages and features of the invention disclosed herein, will be made more apparent from the description, drawings and claims that follow.

BRIEF DESCRIPTION OF THE DRAWINGS

The accompanying drawings, which are incorporated into and form a part of the instant specification, illustrate several aspects and embodiments of the present invention and, together with the description herein, and serve to explain the principles of the invention. The drawings are provided only for the purpose of illustrating select embodiments of the invention and are not to be construed as limiting the invention.

FIG. 7 provides a photographic depiction of an extruded/electro discharge machined pyramidal lattice sandwich structure with a core relative density of 6.2%.

FIG. 8(A) graphically illustrates the compressive stress verses strain response. Predictions of the stress for inelastic buckling and plastic yielding of the trusses are also shown.

FIGS. 8(B)-(G) provide photographic depictions of the lattice deformation at strain levels ($\epsilon$) of 0, 5, 10, 15, 20 and 25%, respectively.

FIG. 9(A) graphically illustrates the shear stress verses shear strain response. Predictions of the stress for inelastic buckling and plastic yielding of the trusses are also shown.

FIGS. 9(B)-(D) provide photographic depictions of the lattice deformation at strain levels ($\gamma$) of 0, 6 and 12%, respectively.

FIGS. 10(A)-(B) graphically illustrates the normalized (a) compression and (b) shear stiffness measurements, respectively, versus strain.

FIGS. 12(A)-(C) provide the impulse loading stage, core crushing stage, and panel bending stage, respectively.

DETAILED DESCRIPTION OF THE INVENTION

As described earlier, a variety of lattice topologies can be fabricated from ductile metals using current fabrication methods that rely on cutting, stamping and/or bending processes to form the desired lattice core, which is then subsequently bonded to facesheet by a variety of methods including, but not limited to, adhesives, diffusion bonding, brazing, soldering or resistance/electron/laser welding, coupling, etc. The design of the core-to-facesheet interface is of utmost importance. Ultimately, this dictates the amount of load that can be transferred from the facesheets to the core, and, ultimately, supported by the truss assembly.

Provided herein, an aspect of an embodiment provides methods and systems that result in sandwich structures with highly robust nodes that can be manufactured from any metal, including, but not limited to steel, aluminum, copper, magnesium, nickel, titanium alloy, etc. These methods are well-suited for alloys that possess limited ambient temperature formability.

The following are exemplary methods and systems of various embodiments of the present invention that can be used to fabricate lattice truss sandwich structures (or any structure as desired/required) from any metal, thus greatly expanding the realm of metals that can be fabricated into cellular structures, as the aforementioned methods (adhesives, diffusion bonding, brazing, soldering or resistance/electron/laser welding, etc.) could only have been fabricated from alloys. In addition, since there is no metallurgical or microstructural discontinuity at the truss-facesheet (truss-faceplate) interface region, the likelihood of corrosion is greatly reduced.

Figure 1A:
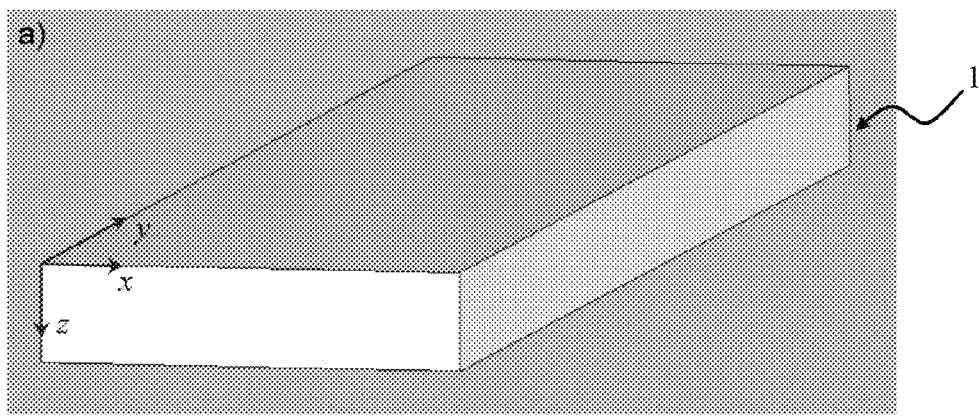
FIGS. 1(A)-(C) provide schematic illustrations of three stages of the manufacturing method utilizing two arrays of channels EDM cut into a monolithic block of metal forming a pyramidal lattice truss sandwich structure.
Figure 1B:
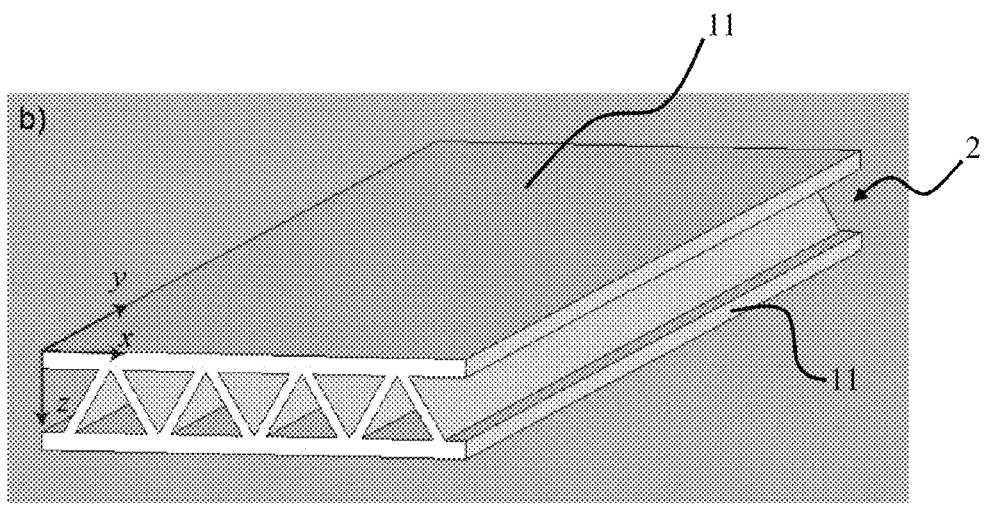
Figure 1C:
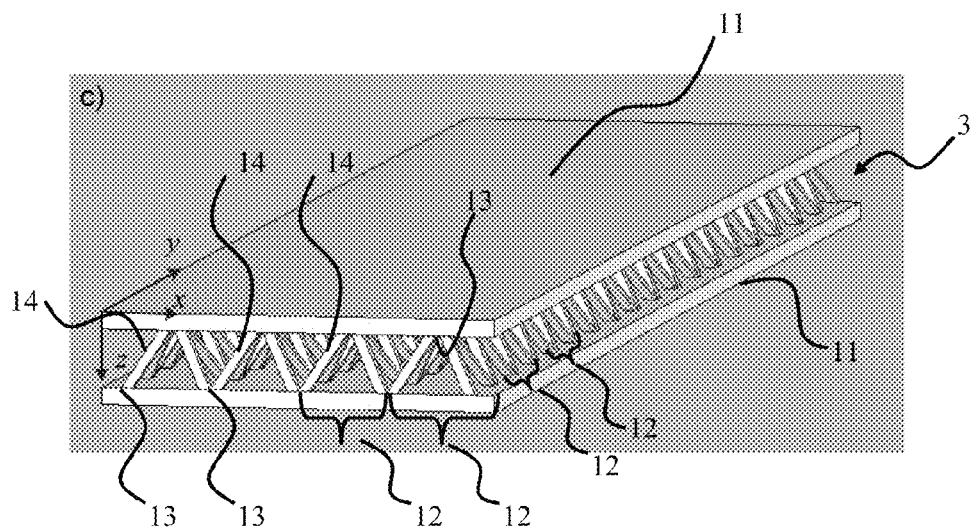

In an exemplary and non-limiting embodiment of an aspect of the present invention, a pyramidal lattice sandwich structure is formed from a solid monolithic sample 1, such as a piece of metal, but not limited thereto. The initial monolithic sample 1 can be sheet, plate, ingot, billet, powder compact, or slurry, or the like, form depending on the size of the final sandwich structure or any desired/required structure. The following is a description for the manufacture of a pyramidal lattice. It should also be appreciated, however, that tetrahedral, Kagome, cone, frustum, or other lattice-based truss structures may be manufactured via this method as desired or required. FIG. 1(A) shows an example of a solid, monolithic sample 1. FIG. 1(B) shows an example of a triangulated pattern machined in the y-direction. This pattern can be machined via electro discharge machining, drilling including laser drilling and other ablative removal techniques in which material is melted or evaporated, cut, water jet cutting, chemical dissolution methods or any other suitable operation. At this point, the structure has the form of a 2D prismatic sandwich structure 2 with facesheets 11 and a consistent cross-section along the y-axis. FIG. 1(C) shows an example of a triangulated pattern machined in the x-direction. Again, this pattern can be machined via electro discharge machining, cutting or any other suitable operation. The result of the combination of these two processes is a 3D lattice truss sandwich structure 3 with facesheets 11 enclosing truss units 12, forming nodes 13 where a truss units 12 interfaces with a facesheet 11. The truss units 12 comprise of a plurality of legs or ligaments 14. The legs may have a variety of shapes such as straight or curved and may have a variety of cross-sections. The plurality of truss units 12 form an array of truss units. While the y-direction path and the x-direction path are shown as substantially straight, it should be appreciate that the paths may be curved or shaped as desired or required. For instance, the array of truss units and panels (or any related components of the resultant structure) may be fabricated so that the truss units and panels (or any related components) may be contoured or shaped as desired or required. Moreover, while the various paths (x, y, and z) as illustrated appear to be substantially orthogonal or perpendicular respectively with one another, it should be appreciated that any respective angles may be implemented as desired or required for the desired or required fabrication process or resultant truss and/or panel structure. In an embodiment, the monolithic sample 1 may comprise at least one select material as desired or required. In an embodiment, the select material may comprise, for example but not limited thereto, ceramic, polymer, metal, metal alloy, and/or any combination of composites thereof (or any material(s) as desired or required. It should be appreciated that the monolithic sample may be machined along a plurality of paths, such as two or more as desired or required. It should be appreciated that the monolithic sample may be extruded along a plurality of paths, such as two or more as desired or required. The area that the faceplate or facesheet and truss units intersect form an interface region. In an embodiment, the interface region has the same metallurgical and microstructural properties. In an embodiment, the truss units have nodes wherein the nodes have the same metallurgical and microstructural properties as the truss unit. In an embodiment, the extruding or machining or both the extruding and machining create the truss units of varying relative density.

Figure 2A:
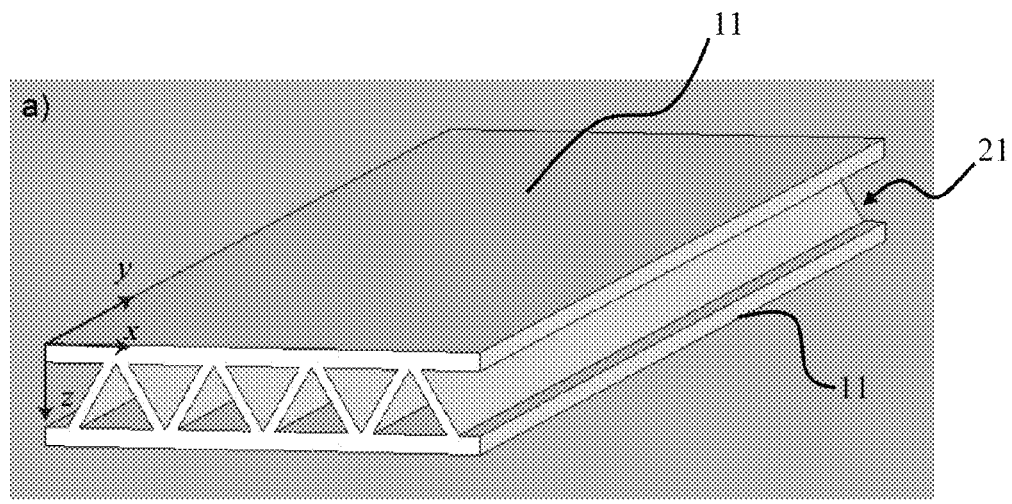
FIGS. 2(A)-(B) provide schematic illustrations of two of the stages of the manufacturing method utilizing a single array of channels EDM cut into an extruded prismatic sandwich structure forming a pyramidal lattice truss sandwich structure.
Figure 2B:
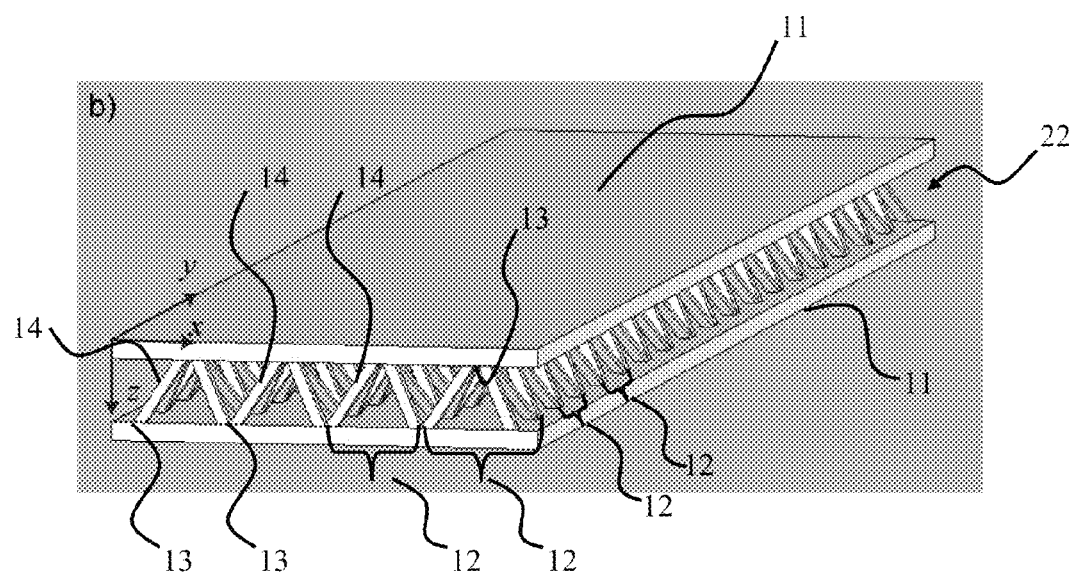

In an exemplary and non-limiting embodiment of an aspect of the present invention, a pyramidal lattice sandwich structure is formed from an extruded prismatic structure. The extruded prismatic structure can take on a variety of shapes, dependent only upon the desired topology of the final sandwich structure or any desired/required structure. Again, the following is a description for the manufacture of a pyramidal lattice. It is envisioned, however, that tetrahedral, Kagome, cone, frustum, or other lattice-based truss structures may be manufactured via this method. FIG. 2(A) shows an example of an extruded triangulated pattern 21 (extruded direction is the y-direction), with facesheets 11. FIG. 2(B) shows an example of a triangulated pattern machined in the x-direction of the extruded topology, the combination of these two steps producing a pyramidal lattice sandwich structure. Again, this pattern can be machined via electro discharge machining, cutting, drilling including laser drilling and other ablative removal techniques in which material is melted or evaporated, water jet cutting, chemical dissolution methods or any other suitable operation resulting in the 3D lattice truss sandwich structure 22 with facesheets 11 enclosing truss units 12, forming nodes 13 where truss legs or ligaments 14 interface with a facesheet 11. The truss units 12 comprise of a plurality of legs or ligaments 14. The legs may have a variety of shapes such as straight or curved and may have a variety of cross-sections. The plurality of truss units 12 form an array of truss units. While the y-direction path and the x-direction path are shown as substantially straight, it should be appreciate that the paths may be curved or shaped as desired or required. For instance, the array of truss units and panels (or any related components of the resultant structure) may be fabricated so that the truss units and panels (or any related components) may be contoured or shaped as desired or required. Moreover, while the various paths (x, y, and z) as illustrated appear to be substantially orthogonal or perpendicular respectively with one another, it should be appreciated that any respective angles may be implemented as desired or required for the desired or required fabrication process or resultant truss and/or panel structure. In an embodiment, the monolithic sample 1 may comprise at least one select material as desired or required. In an embodiment, the select material may comprise, for example, but not limited thereto, ceramic, polymer, metal, metal alloy, and/or any combination of composites thereof (or any material(s) as desired or required. It should be appreciated that the monolithic sample may be machined along a plurality of paths, such as two or more as desired or required. It should be appreciated that the monolithic sample may be extruded along a plurality of paths, such as two or more as desired or required. The area that the facesheet or faceplate and truss units intersect form an interface region. In an embodiment, the interface region has the same metallurgical and microstructural properties. In an embodiment, the truss units have nodes wherein the nodes have the same metallurgical and microstructural properties as the truss unit. In an embodiment, the extruding or machining or both the extruding and machining create the truss units of varying relative density.

Figure 3:
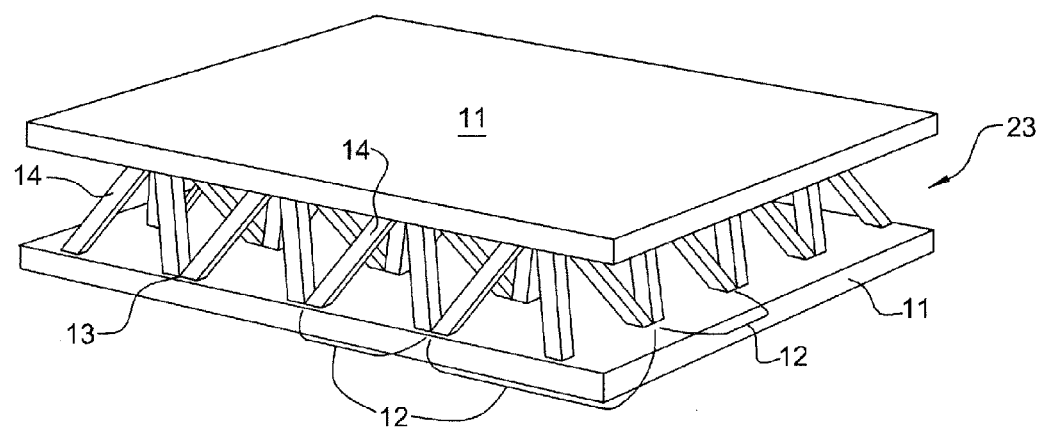
FIG. 3 provides a photographic depiction of a pyramidal lattice sandwich structure which was EDM cut from a 6061 aluminum alloy extrusion.

FIG. 3 provides a photographic depiction of a pyramidal lattice sandwich structure 23 which was EDM cut from a 6061 aluminum alloy extrusion with facesheets 11 enclosing truss units 12, forming nodes 13 where truss legs or ligaments 14 interfaces with a facesheet 11.

Figure 4A:
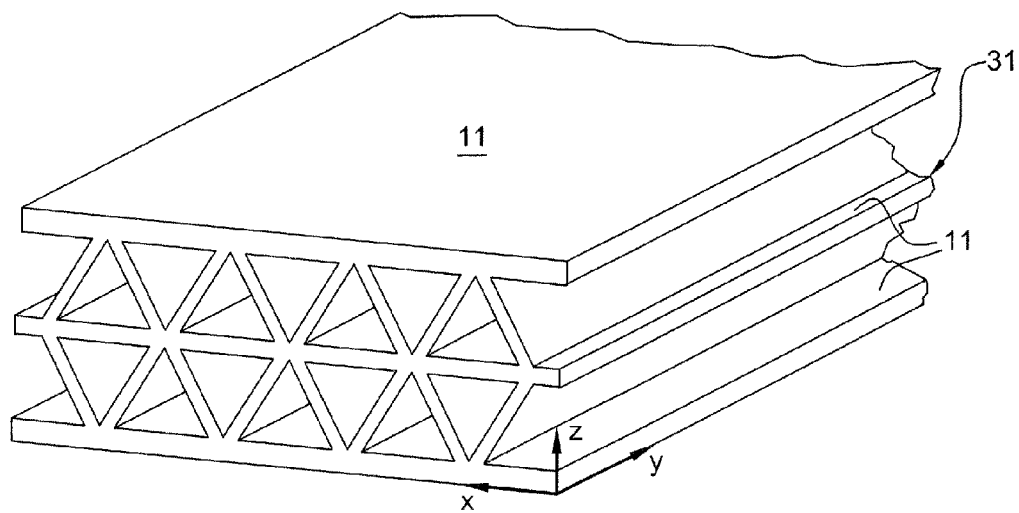
FIGS. 4(A)-(B) provide schematic illustrations of two of the stages of the manufacturing method of a double-layer pyramidal lattice sandwich structure with aligned nodes between adjacent layers and a double array of channels EDM cut into an extruded double-layer prismatic sandwich structure.
Figure 4B:
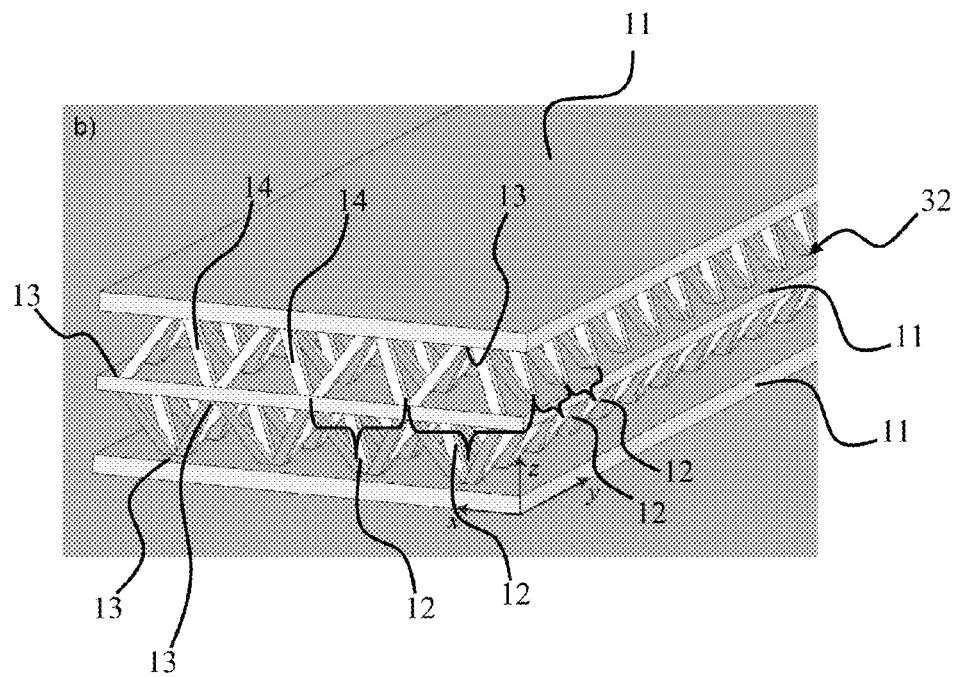

In an exemplary and non-limiting embodiment of an aspect of the present invention, these manufacturing techniques may be used to form multi-layered sandwich panels. Again, the following is a description for the manufacture of a double-layer pyramidal lattice, however, it is envisioned that tetrahedral, Kagome, cone, frustum, or other lattice-based truss structures of any number of layers may be manufactured via this method. FIG. 4(A) shows an example of a double-layer extruded triangular pattern 31 sandwich structure (extruded direction is the y-direction). FIG. 4(B) shows an example of a triangulated pattern machined in the x-direction of the extruded topology, forming a pyramidal lattice sandwich structure. Again, this pattern can be machined via electro discharge machining, drilling including laser drilling, cutting, removing and other ablative removal techniques in which material is melted or evaporated, water jet cutting, chemical dissolution methods or any other suitable operation. The combination of these two steps produces a multi-layered 3D lattice truss sandwich structure 32, with facesheets 11 enclosing truss units 12, forming nodes 13 where truss legs or ligaments 14 interface with a facesheet 11. It is noted that the alignment of nodes 32 between adjacent layers is not a prerequisite. As with this embodiment or any embodiments discussed herein, each individual layer may be aligned or offset any amount from adjacent layers, yielding the desired properties for the structure as a whole and the layers individually. Similarly, the truss units may have any number of legs or ligaments according to the fabrication approach. The truss units 12 comprise of a plurality of legs or ligaments 14. The legs may have a variety of shapes such as straight or curved and may have a variety of cross-sections. The plurality of truss units 12 form an array of truss units. While the y-direction path and the x-direction path are shown as substantially straight, it should be appreciate that the paths may be curved or shaped as desired or required. Moreover, while the various paths (x, y, and z) as illustrated appear to be substantially orthogonal or perpendicular respectively with one another, it should be appreciated that any respective angles may be implemented as desired or required for the desired or required fabrication process or resultant truss and/or panel structure. For instance, the array of truss units and panels (or any related components of the resultant structure) may be fabricated so that the truss units and panels (or any related components) may be contoured or shaped as desired or required. In an embodiment, the monolithic sample 1 may comprise at least one select material as desire or required. In an embodiment, the select material may comprise, for example but not limited thereto, ceramic, polymer, metal, metal alloy, and/or any combination of composites thereof (or any material(s) as desired or required. It should be appreciated that the monolithic sample may be machined along a plurality of paths, such as two or more as desired or required. It should be appreciated that the monolithic sample may be extruded along a plurality of paths, such as two or more as desired or required. The area that the faceplate/facesheet and truss units intersect form an interface region. In an embodiment, the interface region has the same metallurgical and microstructural properties. In an embodiment, the truss units have nodes wherein the nodes have the same metallurgical and microstructural properties as the truss unit. In an embodiment, the extruding or machining or both the extruding and machining create the truss units of varying relative density.

Aspects of various embodiments of the present invention provide, but are not limited to, a novel method and system to manufacture lattice-based truss sandwich structures or any desired/required structures that provides enhanced truss-facesheet interface strength by avoiding poor joint design or bonding procedures, which can cause the catastrophic failure of sandwich panels. Although numerous factors determine the robustness of joined nodes (joint composition, microstructure, degree of porosity, geometric constraints, etc.) this new method results in sandwich structures with highly robust nodes that have the equivalent metallurgical, for instance strength, ductility, chemical composition, microstructural characteristics, etc. of the parent material. Aspects of the present invention methods can be used for, but are not limited to, any solid, metal, or metal alloy, including, but not limited to steels, aluminum, copper, magnesium, nickel, titanium alloy, etc. and is highly suited for alloys which possess limited ambient temperature ductility.

This approach can be extended to other material classes. For example, various approaches have been developed for producing polymeric structures with prismatic cores that can then be fabricated via the means described heretofore, including 3D lattice truss sandwich structures. Ceramic materials with prismatic cores can also be fabricated using "green state" extrusion forming and sintering, in which the material can be laterally machined prior to or after a sintering operation. Edge-defined film fed growth also provides a means for fabricating prismatic structures of the type envisioned here from many types of materials, including ceramics (sapphire for example) and semiconductors (such as silicon).

Practice of the invention will be still more fully understood from the following examples and experimental results, which are presented herein for illustration only and should not be construed as limiting the invention in any way.

Example and Experimental Results

An aspect of an embodiment of this invention may comprise an extrusion and electro discharge machining (EDM) method has been developed to fabricate a pyramidal lattice core sandwich structure. The approach is readily extendable to tetrahedral and to multilayer versions of these lattices. In this approach, a 6061 aluminum alloy corrugated core sandwich panel is first extruded, creating an integral core and facesheets, fashioned from a single sample of material. The corrugated core (or any core shape as desired or required) is then penetrated by an alternating pattern of triangular shaped EDM electrodes normal to the extrusion direction to form the pyramidal lattice. The process results in a sandwich panel in which the core-facesheet nodes posses the parent materials' metallurgical and mechanical properties. The out-of-plane compression and in-plane shear mechanical properties of the structure have been measured and found to be very well predicted by analytical estimates.

Figure 5:
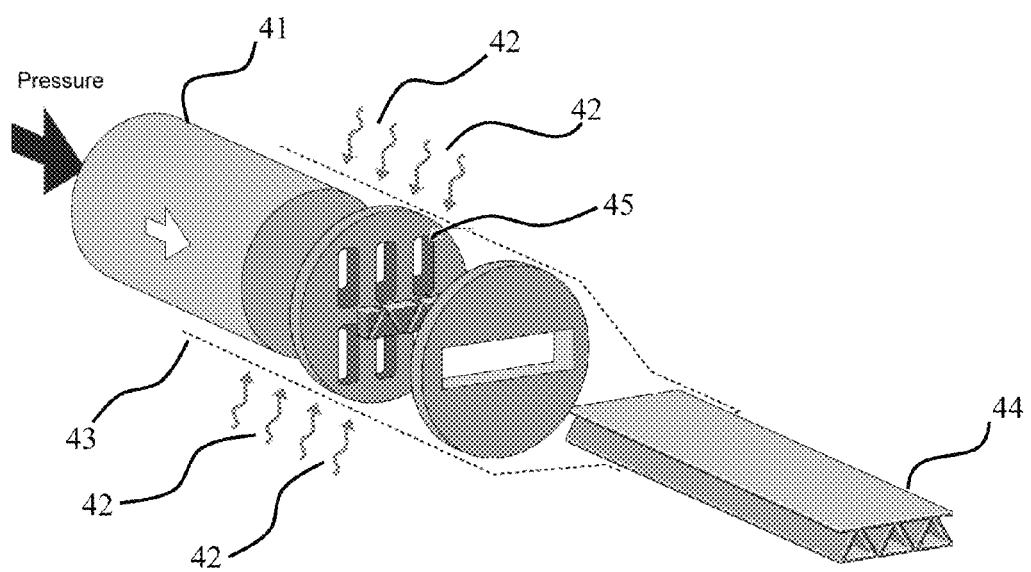
FIG. 5 provides a schematic illustration of the extrusion process used to produce 6061 aluminum corrugated sandwich structures.

Referring to FIG. 5, a sample 41, such as an extrusion billet for example, comprising 6061 aluminum alloy, was extruded with a regular prismatic structure using extrusion press 43 (as schematically shown by the dotted lines) by a heat source 42. In this example the heat is applied at 482° C. and the press 43 (having flow channels 45) has a dimension of 17.8 cm diameter, 300 ton direct extrusion press at 482° C., resulting in a corrugated core sandwich panel structure 44, such as a long extrusion stick.

Figures 6A, 6B:
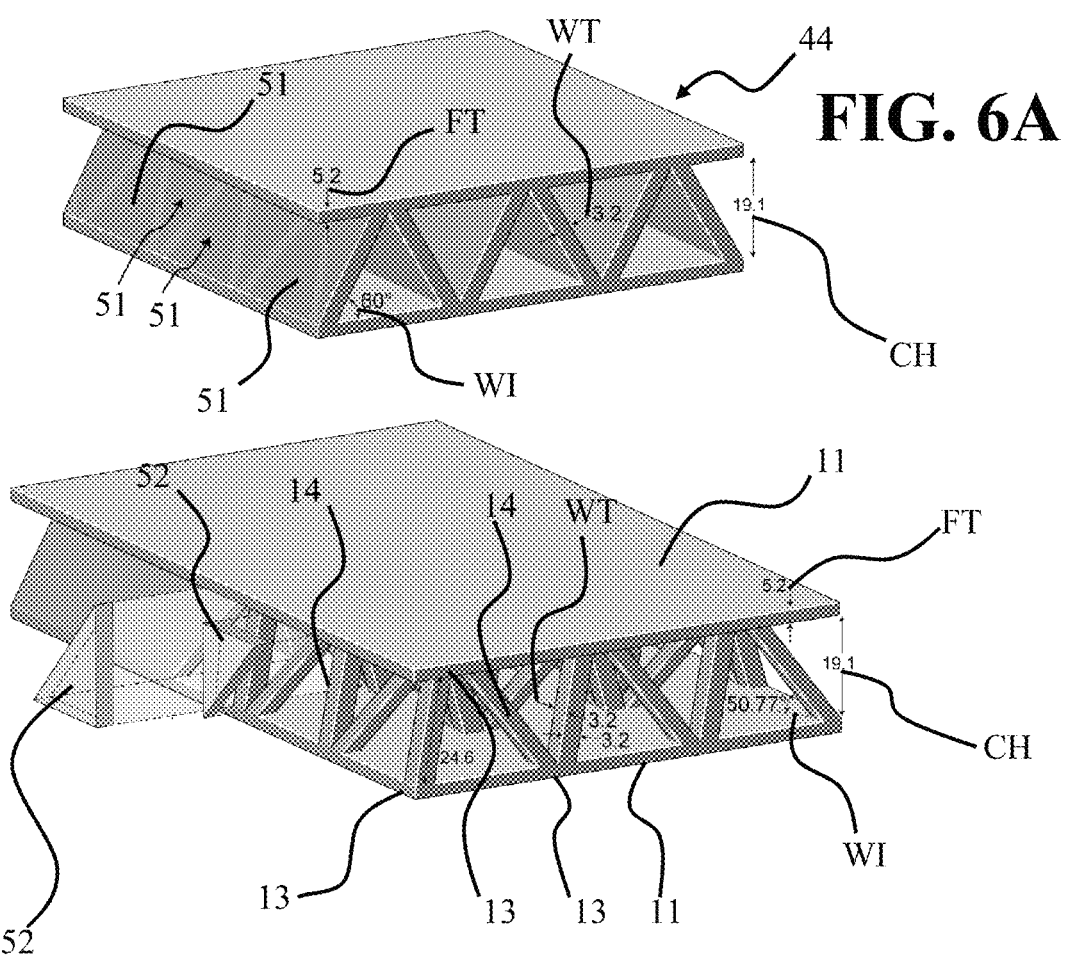
FIGS. 6(A)-(B) provide schematic illustrations of the regions in the corrugated core that are removed by electro discharge machining to create a pyramidal lattice core sandwich panel structure.

Referring to FIG. 6(A), after this extrusion step (as shown in FIG. 5), the resulting corrugated core sandwich panel structure 44 had a web thickness of 3.2 mm as designated by arrow WT, a core height of 19.1 mm as designated by the arrow CH, and a facesheet thickness of 5.2 mm as designated as FT and a web inclination angle of 60° as designated by arrow WI. The relative density of the corrugated core was 25%. The extruded panels were solutionized, water-quenched and heat-treated to a T6 condition. An alternating pattern of triangular shaped EDM electrodes (not shown) were then inserted normal to the extrusion direction as illustrated in FIG. 6(A) as the patterns to be removed 51 to form the pyramidal lattice sandwich panel, as shown FIG. 6(B). The triangular plates are shown as cutouts 52 that are perpendicular to the extrusion. The process resulted in a sandwich panel in which the core-facesheet nodes 13 had identical microstructure, composition and mechanical properties to those of the trusses 14 and facesheets 11.

It should be appreciated that any dimensions or angles shown herein are exemplary and illustrative only and should not be construed as limiting the invention in any way. The sizes, materials, flexibility, rigidity, shapes, contours, angles or dimensions discussed or shown may be altered or adjusted as required or desired.

FIG. 7 shows a photographic depiction of one of the pyramidal lattice sandwich structures. It is 4 unit cells wide by 4 unit cells long as shown by the respective truss-units 12, and was used for compression measurements. The shear response was measured using samples (not shown) that were 4 unit cells wide and 10 unit cells long.

Test Results

The relative density can be derived for the pyramidal structure depends upon the truss cross sectional area, $t^2$, its inclination angle, $\omega$, and length, $l$. The ratio of the metal volume in a unit cell to that of the unit cell then gives the relative density:

$$\bar{\rho} = \frac{2t^2}{l^2 \sin\omega \cos^2\omega} \cdot \frac{l^2 \cos^2\omega}{\left(l\cos\omega + \sqrt{2}\,t\right)^2}. \tag{1}$$

For the samples manufactured here, t=3.2 mm, l=24.6 mm and $\omega$=50.77° resulting in a predicted relative density of 6.5%. The experimentally measured relative density was 6.2±0.01%.

The lattice truss structures were tested at ambient temperature in compression and shear at a nominal strain rate of $10^{-2}$ s$^{-1}$ in accordance with ASTM C365 and C273 using a compression shear plate configuration. A laser extensometer measured the compressive strain by monitoring the displacements of the unconstrained facesheets (with a displacement precision of ±0.001 mm. The shear strain was obtained by monitoring the displacements of the shear plates with a measurement precision of ±0.010 mm.

Referring to FIG. 8, the through thickness compressive stress—strain response pertaining to the pyramidal lattice sandwich structure substantially shown in FIG. 7 is graphically shown in FIG. 8(A). FIGS. 8(B)-(G) show photographic depictions of the lattice deformation at strain levels ($\epsilon$) of 0, 5, 10, 15, 20 and 25%, respectively. Following an initial linear response, a peak was observed in the compressive stress that coincided with initiation of the buckling of the lattice truss members and the formation of a plastic hinge near the center of the truss members. Continued loading resulted in core softening up to an engineering strain of ~0.25 at which point the load carrying capacity increased rapidly as the deformed trusses made contact with the facesheets. During the core-softening phase, small fractures were observed to form on the tensile stressed side of the trusses. These were first seen at strains of between 0.10 and 0.12. No failures at the truss-facesheet nodes were observed during any of the tests.

Referring to FIG. 9(A), the in-plane shear stress—strain response pertaining to the pyramidal lattice sandwich structure substantially shown in FIG. 7 is graphically shown in FIG. 9(A). FIGS. 9(B)-(D) show photographic depictions of the lattice deformation at strain levels ($\gamma$) of 0, 6 and 12%, respectively. In this test orientation, each unit cell had two truss members loaded in compression and two in tension. The sample exhibited characteristics typical of lattice truss based sandwich cores including: elastic behavior during initial loading and increasing load support capability until the peak strength was reached. Continued loading continued at a constant stress up to a strain of ~0.13, at which point the sample failed by fracture of the tensile loaded lattice members near their midpoint. Some plastic buckling was observed on truss members at the ends of the sandwich panel. It is a manifestation of the compressive loading component of the ASTM 273 test method. No evidence of node failure was observed during any of the shear experiments.

Tensile coupons of the aluminum 6061 alloy were used to determine the mechanical properties of the parent aluminum alloy. Tensile tests were performed according to ASTM E8 at a strain rate of $10^{-3}$ s$^{-1}$. The average Young's modulus, $E_s$, and 0.2% offset yield strength, $\sigma_{ys}$, were 69 GPa and 268 MPa, respectively. The tangent modulus, $E_t$, at the inelastic bifurcation stress was 282 MPa.

The peak strength of a lattice truss core is determined by the mechanism of strut failure which, in turn, depends on the cell geometry, strut material properties and the mode of failure loading. Table 1 summarizes the micromechanical predictions for the pyramidal lattice. The micromechanical predictions for the compressive and shear peak strength are shown in FIGS. 8(A) and 9(A) for truss members that fail by plastic yielding or inelastic buckling. There is excellent agreement between the analytical model predictions of the peak strengths and the observed modes of deformation.

The compression and shear stiffnesses were measured from periodic unload/reload measurements. FIG. 10(A) graphically shows the non-dimensional compressive stiffness, $\Pi=E_c/(E_s\bar{\rho})$, versus compressive strain (here $E_c$ and $E_s$ are the Young's moduli of the core and the solid parent alloy respectively, and $\bar{\rho}$ is, again, the relative density). The predicted non-dimensional compressive stiffness is 0.36. The experimental data fall slightly above 0.36 just prior to attainment of the peak strength and then decrease during the inelastic buckling phase of deformation. FIG. 10(B) graphically shows the non-dimensional shear stiffness, $\Gamma=G_c/(E_s\bar{\rho})$, versus shear strain (here $G_c$ is the shear stiffness of the core). The predicted non-dimensional shear stiffness of 0.12 and the experimental data are in excellent agreement up until failure of the panel.

Table 1 provides the analytical expressions for the compression and shear stiffness and strength of a pyramidal lattice truss core sandwich structure.

TABLE 1

| Mechanical Property: | Analytical Expression: |
| --- | --- |
| Compressive stiffness | $E_c = \bar{\rho}E_s \cdot \sin^4 \omega$ |
| Compressive strength (plastic yielding) | $\sigma_{pk} = \bar{\rho}\sigma_{ys} \cdot \sin^2 \omega$ |
| Compressive strength (inelastic buckling) | $\sigma_{pk} = \bar{\rho}\sigma_{cr} \cdot \sin^2 \omega$ |
| Shear stiffness | $G_c = \bar{\rho} \cdot \frac{1}{8}E_s \cdot \sin^2 2\omega$ |
| Shear strength (plastic yielding) | $\tau_{pk} = \bar{\rho} \cdot \frac{1}{2\sqrt{2}}\sigma_{ys} \cdot \sin 2\omega$ |
| Shear strength (inelastic buckling) | $\tau_{pk} = \bar{\rho} \cdot \frac{1}{2\sqrt{2}}\sigma_{cr}\sin 2\omega$ |

A new method for fabricating a lattice truss core sandwich panel structure has been developed using a combination of extrusion and electro discharge machining. The approach has been illustrated by the fabrication and mechanical property evaluation of sandwich panels made from a 6061 aluminum alloy; however, the method is applicable to any alloy system that can be easily extruded. For materials that can not be extruded, the electro discharge machining method could be performed in two directions (instead of one as described here) on a monolithic plate resulting in a similar lattice structure. This alternative method, therefore, is extendable to most conductive material systems or other material systems as desired or required.

The measured peak compressive and shear strengths were found to be in excellent agreement with the micromechanical model predictions for the operative truss member failure mechanisms: inelastic buckling for compression and plastic yielding (followed by tensile fracture) for shear. The non-dimensional compression and shear moduli coefficients were found to be in excellent agreement with the analytical predictions.

Conventional sandwich panel structures suffer from node failure during static and dynamic testing. These failures are initiated at defects or in weak or embrittled regions that result from core-faceplate bonding (facesheet bonding) processes. Whereas, the present invention fabrication method described above, results in sandwich panels in which the core-facesheet nodes have identical material properties to those of the trusses and facesheets. Joining methods such as brazing or welding have been eliminated with this process. No evidence of nodal failure was observed during compression or shear loading of the samples fabricated by the method described here.

The method of sandwich panel manufacture described here has been used to fabricate sandwich panels that eliminate the incidence of nodal failures. The panels' mechanical properties are found to be governed only by the geometry of the sandwich panel, the alloy mechanical properties, and the mode of loading. These properties are well predicted by recent micromechanical models.

Figure 11:
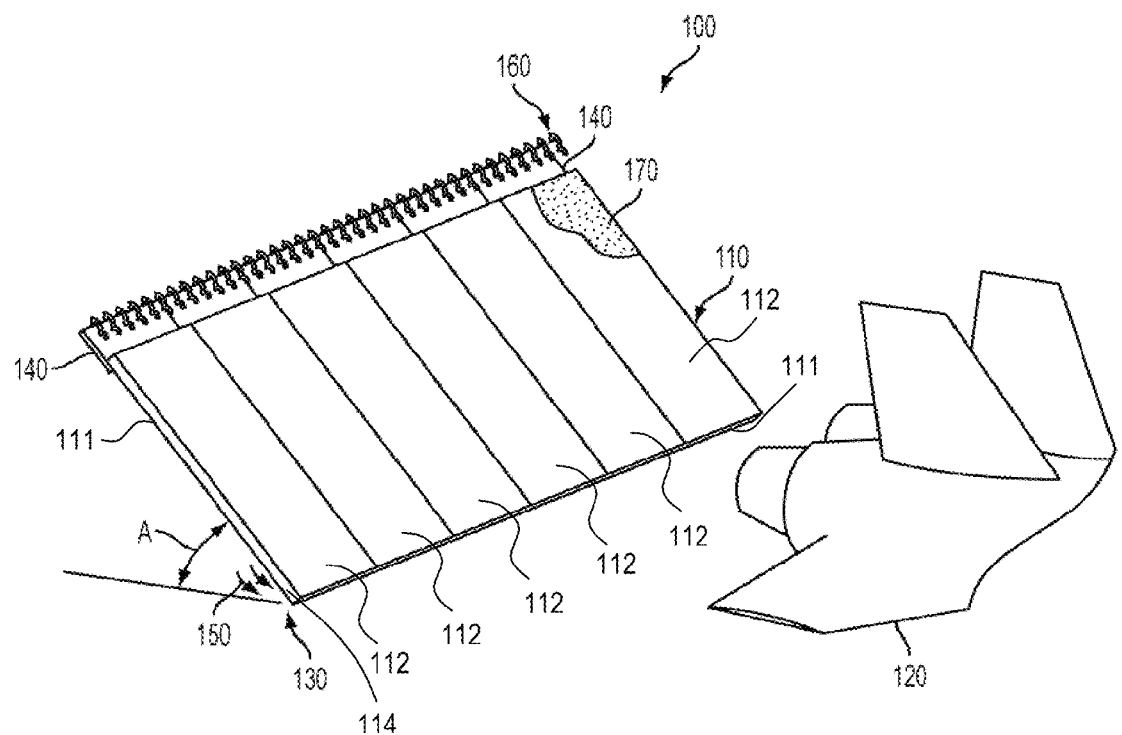
FIG. 11 provides a schematic illustration of one embodiment of a sandwich structure of the p-JBD system interacting with a jet.

FIG. 11 is a schematic illustration of one embodiment of p-JBD system 100 interacting with jet 120. When jet 120 emits a jet blast (not pictured), it interacts with p-JBD 110 or the like. The thermal component of the jet blast is absorbed in to the structure of p-JBD 110 or the like and spread across its surface, and the kinetic component of the jet blast is deflected up and over p-JBD 110. As the kinetic component passes over the top of p-JBD 110 it must travel over the deployable ejector plate 140, which creates a low pressure or vacuum region (not pictured) above p-JBD 110 as the kinetic component interacts with the ambient air there. This process pulls cool air 150, brought into p-JBD 110 through inlet 130 at its base up through the p-JBD structure, thus removing the thermal component of the jet blast stored there. As a result hot air 160 is expelled out the top of p-JBD 110. It should be appreciated that in some embodiments, p-JBD 110 may be coated with a spray-on non-skid protective surface 170 or any other form of coating designed to provide traction. Passive in this context implies a system that does not necessarily require an active cooling system. Although, it should be appreciated that an active cooling system may be added, supplemented or implemented with the disclosed cooling system and related method disclosed throughout this document regarding the present invention methods and systems. As shown, the p-JBD 110 comprises a plurality of first plates 112 in communication or joined (e.g., side-by-side or laterally) with one another along with their respective second plates 111 on the back side with a core 114 disposed there between.

Further, during assembly of any of the components related with the JBD system a variety of welding or joining techniques may be applied, including, but not limited thereto, friction stir welding for effective joining. Some of the joints, particularly "lap joints" provide open paths to bare aluminum (or desired or required material) of the plates or cores (for example), which in turn may produce undesirable corrosion product in certain instances. To prevent this, optionally special sealants may be employed which are applied during welding (e.g., friction stir welding or as desired or required) to those lap joints.

Figure 12A:
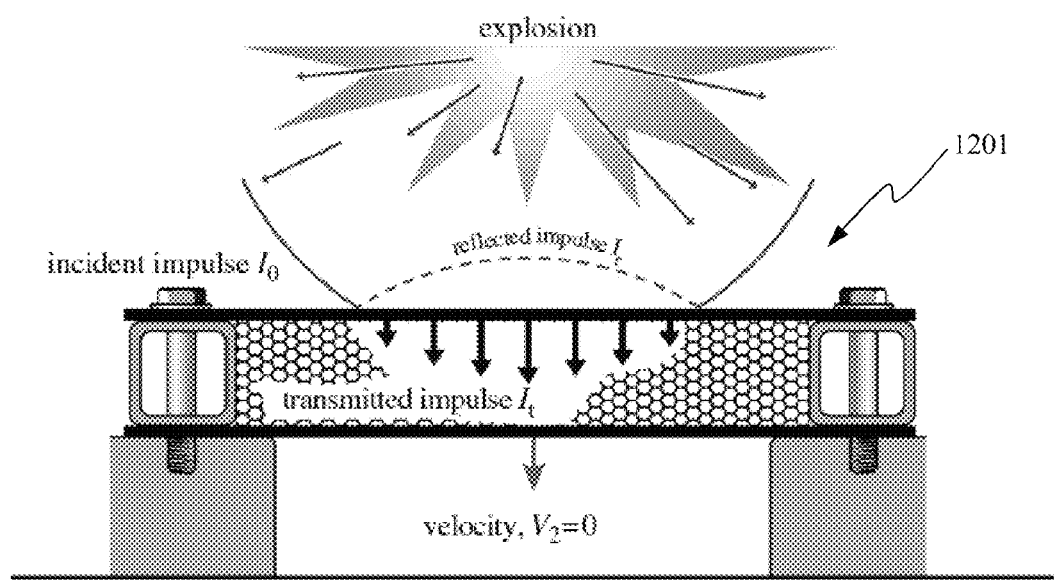
FIGS. 12(A)-(C) provide schematic illustrations of an embodiment of a sandwich structure demonstrating blast or explosion mitigation in response to an explosion.
Figure 12B:
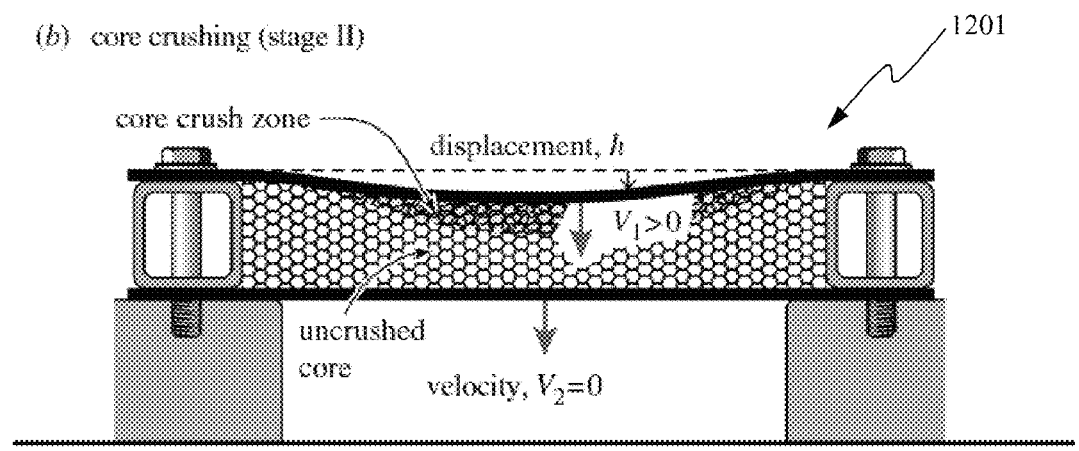
Figure 12C:
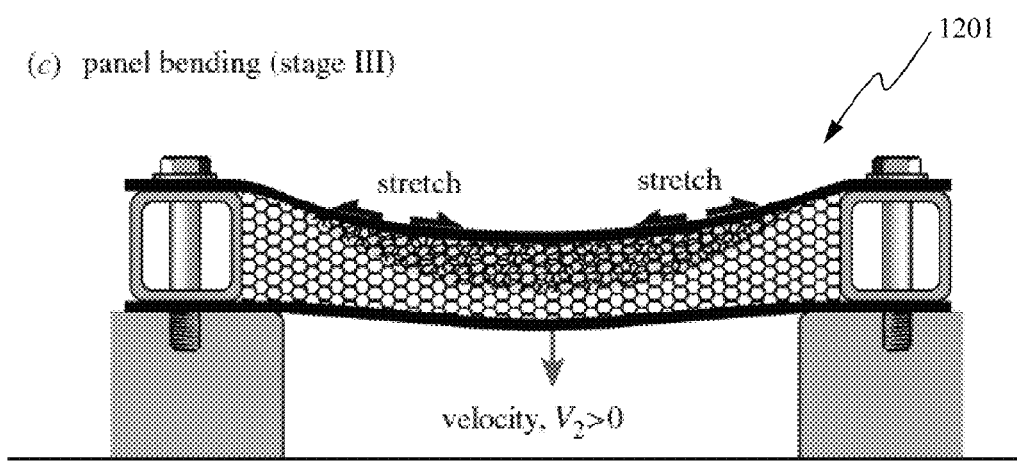
Figure 13A:
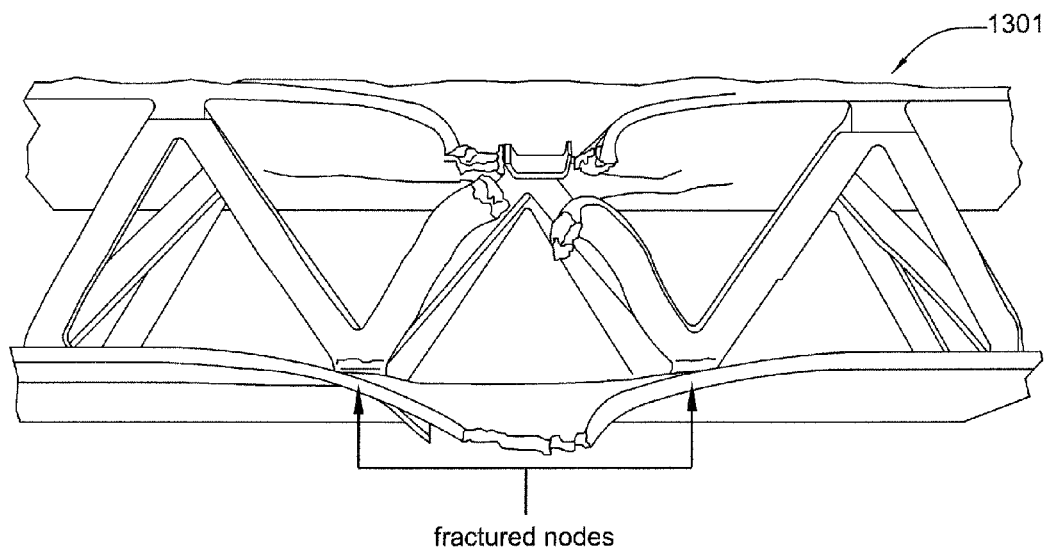
FIGS. 13(A)-(D) provide schematic illustrations of an embodiment of a sandwich structure 1201 demonstrating projectile arresting capabilities in response to a projectile, which provides various rupture and fracture details.
Figure 13B:
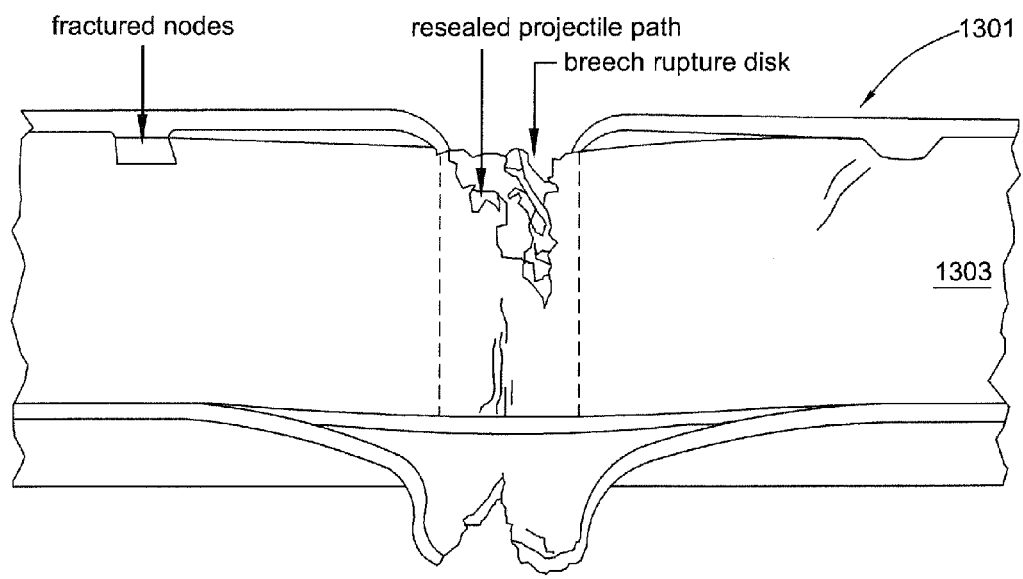
Figure 13C:
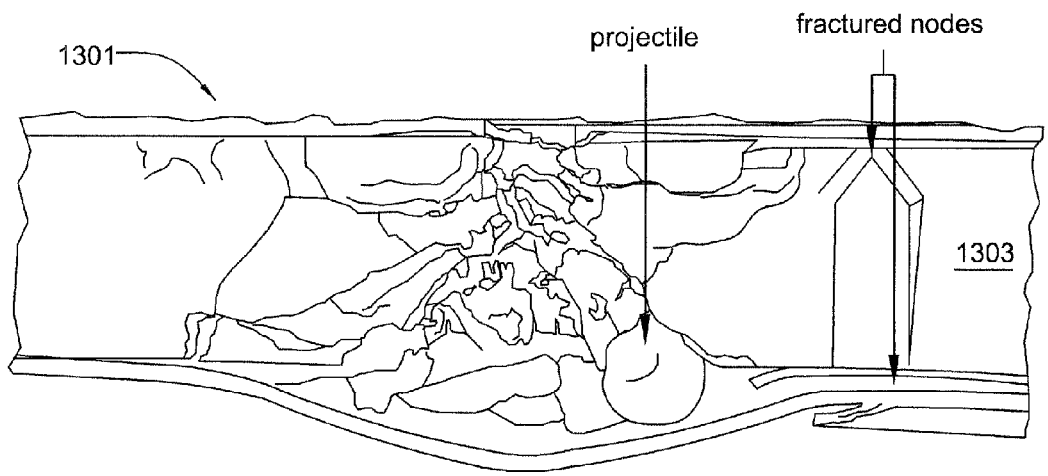
Figure 13D:
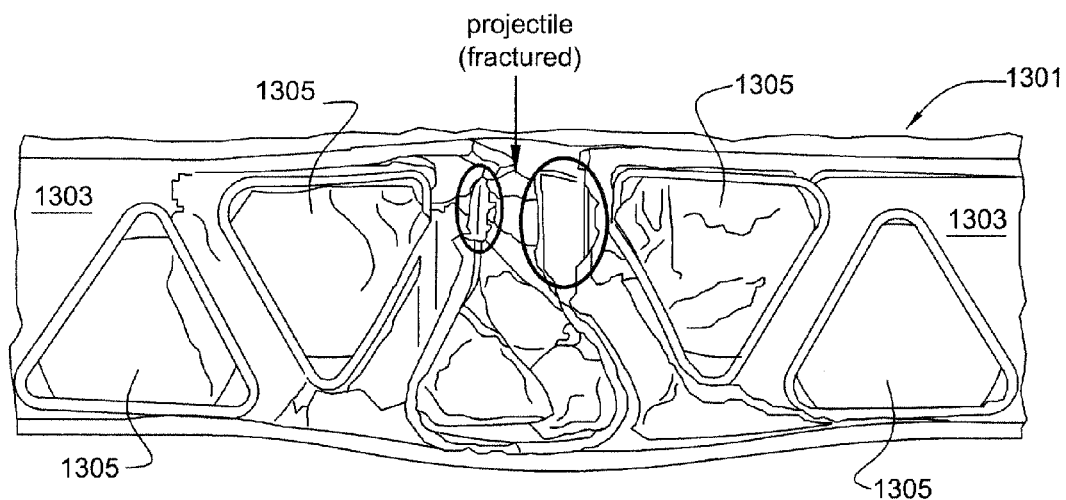

FIGS. 12(A)-(C) are schematic illustration of an embodiment of a sandwich structure 1201 demonstrating blast or explosion mitigation in response to an explosion. FIGS. 12(A)-(C) provide the impulse loading stage, core crushing stage, and panel bending stage, respectively.

FIGS. 13(A)-(D) are schematic illustration of an embodiment of a sandwich structure 1301 demonstrating projectile arresting capabilities in response to a projectile, which provides various rupture and fracture details. As shown inserts 1305 (e.g., prism shaped) are disposed therein and filler material 1303 (e.g., elastomers) in the interstial space of the sandwich structure 1301.

REFERENCES CITED

The following patents, applications and publications as listed below and throughout this document are hereby incorporated by reference in their entirety herein. The devices, systems, articles of manufacture and methods of various embodiments of the present invention disclosed herein may utilize aspects disclosed in the following patents and applications and are hereby incorporated by reference in their entirety:

PCT International Application No. PCT/US02/17942, entitled "Multifunctional Periodic Cellular Solids And The Method of Making Thereof," filed Jun. 6, 2002, and corresponding U.S. application Ser. No. 10/479,833, entitled "Multifunctional Periodic Cellular Solids And The Method of Making Thereof," filed on Dec. 5, 2003.

PCT International Application No. PCT/US03/16844, entitled "Method for Manufacture of Periodic Cellular Structure and Resulting Periodic Cellular Structure," filed May 29, 2003, and corresponding U.S. application Ser. No. 10/515,572, entitled "Multifunctional Periodic Cellular Solids And The Method of Making Thereof," filed Nov. 23, 2004.

PCT International Application No. PCT/US04/04608, entitled "Methods for Manufacture of Multilayered Multifunctional Truss Structures and Related Structures There from," filed Feb. 17, 2004, and corresponding U.S. application Ser. No. 10/545,042, entitled "Methods for Manufacture of Multilayered Multifunctional Truss Structures and Related Structures There from," filed Aug. 11, 2005.

PCT International Application No. PCT/US01/22266, entitled "Method and Apparatus For Heat Exchange Using Hollow Foams and Interconnected Networks and Method of Making the Same," filed Jul. 16, 2001, and corresponding U.S. application Ser. No. 10/333,004, entitled "Heat Exchange Foam," filed Jan. 14, 2003.

PCT International Application No. PCT/US01/25158 entitled "Multifunctional Battery and Method of Making the Same", filed Aug. 10, 2001, and corresponding U.S. application Ser. Nos. 10/110,368, entitled "Multifunctional Battery and Method of Making the Same", filed Jul. 22, 2002, and 11/788,958, entitled "Multifunctional Battery and Method of Making the Same", filed Apr. 23, 2007.

PCT International Application No. PCT/US03/27606, entitled "Method for Manufacture of Truss Core Sandwich Structures and Related Structures Thereof," filed Sep. 3, 2003, and corresponding U.S. application Ser. No. 10/526,296, entitled "Method for Manufacture of Truss Core Sandwich Structures and Related Structures Thereof," filed Mar. 1, 2005.

PCT International Application No. PCT/US01/17363, entitled "Multifunctional Periodic Cellular Solids And The Method of Making Thereof," filed May 29, 2001, and corresponding U.S. application Ser. No. 10/296,728, entitled "Multifunctional Periodic Cellular Solids And The Method of Making Thereof," filed Nov. 25, 2002.

PCT International Application No. PCT/US2007/012268, entitled "Method and Apparatus for Jet Blast Deflection", filed May 23, 2007 and corresponding U.S. application Ser. No. 12/301,916, entitled "Method and Apparatus for Jet Blast Deflection," filed Nov. 21, 2008.

ASTM. C273 Standard Test Method for Shear Properties of Sandwich Core Materials. West Conshohocken, Pa., USA: ASTM International, 2006.

ASTM. C365 Standard Test Method for Flatwise Compressive Properties of Sandwich Cores. West Conshohocken, Pa., USA: ASTM International, 2006.

ASTM. E8 Standard Test Methods for Tension Testing of Metallic Materials. West Conshohocken, Pa., USA: ASTM International, 2006.

Bitzer, T. 1997 Honeycomb technology. London: Chapman & Hall.

Chiras, S., Mumm, D. R., Evans, A. G., Wicks, N., Hutchinson, J. W., Dharmasena, K. P., Wadley, H. N. G. and Fichter, S., 2002. The structural performance of near-optimized truss core panels. International Journal Solids and Structures, 39 (15) 4093-4115.

Cote, F., Deshpande, V. S. and Fleck, N. A., Shear fatigue strength of a prismatic diamond sandwich core. Scripta Materialia 2007; 56:585-588.

Cote, F., Fleck, N. A. and Deshpande, V. S., Fatigue performance of sandwich beams with a pyramidal core. International Journal of Fatigue 2007; 29:1402-1412.

Deshpande, V. S., Fleck, N. A. and Ashby, M. F., 2001. Effective properties of the octet-truss lattice material. Journal of the Mechanics and Physics of Solids, 49 (8), 1747-1769.

Deshpande, V. S. and Fleck, N. A., 2001. Collapse of truss core sandwich beams in 3-point bending. International Journal of Solids and Structures, 38 (36-37), 6275-6305.

Evans, A. G., Hutchinson, J. W. and Ashby, M. F., Cellular metals. Current. Opinion in Solid State and Materials Science 1998; 3:288-303.

Evans, A. G., Hutchinson, J. W., Fleck, N. A., Ashby, M. F. and Wadley, H. N. G., The topological design of multifunctional cellular metals. Progress in Materials Science 2001; 46:309-327.

Gibson, L. J. and Ashby M F. Cellular Solids, Structure and Properties. Cambridge: Cambridge University Press, 1997.

Kooistra, G. W., Aluminum alloy lattice truss structures. Materials Science & Engineering, M.S. Charlottesville: University of Virginia, 2006.

Kooistra, G. W., Queheillalt D. T. and Wadley H. N. G., Shear behavior of aluminum lattice truss sandwich panel structures. Materials Science and Engineering A 2007; In Press.

Lim, J. H. and Kang, K. J., 2006. Mechanical behavior of sandwich panels with tetrahedral and Kagome truss cores fabricated from wires. International Journal of Solids and Structures, 43 (17), 5228-5246.

McShane, G. J., Radford, D. D., Deshpande V. S. and Fleck, N. A., 2006. The response of clamped sandwich plates with lattice cores subjected to shock loading. European Journal of Mechanics—A/Solids, 25 (2), 215-229.

Queheillalt, D. T. and Wadley, H. N. G., 2005. Pyramidal lattice truss structures with hollow trusses. Materials Science and Engineering A, 397 (1-2), 132-137.

Queheillalt, D. T. and Wadley, H. N. G., Titanium Alloy Lattice Truss Structures. Materials and Design 2007:Submitted March 2007.

Radford, D. D., Fleck N. A. and Deshpande, V. S., 2006. The response of clamped sandwich beams subjected to shock loading. International Journal of Impact Engineering, 32 (6), 968-987.

Rathbun, H. J., Wei, Z., He, M. Y., Zok, F. W., Evans, A. G., Sypeck, D. J. and Wadley, H. N. G., 2004. Measurement and Simulation of the Performance of a Lightweight Metallic Sandwich Structure with a Tetrahedral Truss Core. Journal of Applied Mechanics, 71 (3), 305-435.

Sugimura, Y., 2004. Mechanical response of single-layer tetrahedral trusses under shear loading. Mechanics of Materials, 36 (8), 715-721.

Sypeck, D. J. and Wadley, H. N. G., 2002. Cellular metal truss core sandwich structures. Advanced Engineering Materials, 4 (10), 759-764.

Wadley, H. N. G., Multifunctional periodic cellular metals. Philosophical Transactions of the Royal Society A: Mathematical, Physical and Engineering Sciences 2006; 364: 31-68.

Wadley, H. N. G., Fleck, N. A. and Evans, A. G., Fabrication and structural performance of periodic cellular metal sandwich structures. Composites Science and Technology 2003; 63:2331-2343.

Wallach, J. C. and Gibson, L. J., 2001. Mechanical behavior of a three-dimensional truss material. International Journal of Solids and Structures, 38 (40-41), 7181-7196.

Wang, J., Evans, A. G., Dharmasena, K. and Wadley, H. N. G., 2003. On the performance of truss panels with Kagomé cores. International Journal of Solids and Structures 40 (25), 6981-6988.

Zhou, J., Shrotiriya, P. and Soboyejo, W. O., 2004. On the deformation of aluminum lattice block structures from struts to structure. Mechanics of Materials, 36 (8), 723-737.

Zok, F. W., Waltner, S. A., Wei, Z., Rathbun, H. J., McMeeking, R. M. and Evans, A. G., 2004. A protocol for characterizing the structural performance of metallic sandwich panels: application to pyramidal truss cores. International Journal of Solids and Structures 41 (22-23) 6249-6271.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the following claims, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

We claim:

1. A method of creating a monolithic lattice truss-based structure comprising:
    providing a monolithic sample;
    extruding said monolithic sample to selectively remove material along a first path; and
    machining said monolithic sample to selectively remove material along a second path, wherein said first path and said second path are offset at a desired offset angle to create a plurality of truss unit portions of said monolithic lattice truss-based structure comprising two facesheets and a plurality of rows of legs between and connecting said facesheets.

2. The method of claim 1, wherein said plurality of truss unit portions comprises an array of truss unit portions.

3. The method of claim 1, wherein said extruding or said machining or both said extruding and said machining creates one or more facesheet portions of said truss structure.

4. The method of claim 3, wherein said truss structure comprises one or more sandwich structures.

5. The method of claim 1, wherein said monolithic sample comprises at least one select material, wherein said select material comprises:
    at least one of ceramic, polymer, metal, metal alloy, or composites thereof.

6. The method of claim 1, wherein said machining of said monolithic sample comprises at least one of the following processes:
    electro discharge machining, punching, drilling including laser drilling and other ablative removal techniques in which material is melted or evaporated, water jet cutting, or chemical dissolution methods.

7. The method of claim 1, wherein at least one of said truss unit portions have a geometrical shape of at least one of:
    tetrahedral, pyramidal, Kagome, cone, frustum, or combinations thereof.

8. The method of claim 1, wherein at least one of said first path and said second path are curved.

9. The method of claim 1, wherein said monolithic sample is machined along a plurality of paths.

10. The method of claim 3, wherein said facesheet portions and said truss unit portions intersect an interface region is defined and wherein said interface region has the same metallurgical and microstructural properties.

11. The method of claim 1, wherein said truss unit portions are created without any joining.

12. The method of claim 1, wherein said truss unit portions are created without any of the following methods:
bonding, adhesives, diffusion bonding, brazing, soldering, or resistance/electron/laser welding, coupling.

13. The method of claim 3, wherein said truss unit portions and facesheet are formed without any joining.

14. The method of claim 3, wherein said truss unit portions are created without any of the following methods:
bonding, adhesives, diffusion bonding, brazing, soldering, transient liquid phase sintering, or resistance/electron/laser welding, coupling.

15. The method of claim 1, wherein said monolithic sample comprises at least one of the following:
sheet, plate, ingot, billet, powder compact, and slurry.

16. The method of claim 1, wherein said truss unit portions having nodes wherein said nodes have the same metallurgical and microstructural properties as said truss unit portions.

17. The method of claim 3, wherein said truss unit portions having nodes wherein said nodes have the same metallurgical and microstructural properties as said truss unit portions and said facesheet portions.

18. The method of claim 1, wherein truss units created by said extruding or said machining or both said extruding and said machining may have varying relative density with respect to each other.

19. The method of claim 4, wherein said one or more sandwich structures provide blast impact mitigation.

20. The method of claim 4, further comprising inserts and filler material disposed between said one or more face sheets, wherein said one or more sandwich structures provide projectile arresting capability.

21. The method of claim 4, wherein said one or more sandwich structures are laterally in communication with one another.

22. The method of claim 21, wherein said communication comprises at least one of the following:
bonding, adhesives, diffusion bonding, brazing, soldering, or resistance/electron/laser welding, coupling.

23. A method of creating a monolithic lattice truss structure comprising:
providing a monolithic sample;
machining said monolithic sample to selectively remove material along a first path; and
machining said monolithic sample to selectively remove material along a second path, wherein said first path and said second path are offset at a desired offset angle to create a plurality of truss unit portions of said monolithic lattice truss structure comprising two facesheets and a plurality of rows of legs between and connecting said facesheets.

24. The method of claim 23, wherein said plurality of truss unit portions comprises an array of truss unit portions.

25. The method of claim 23, wherein first said machining or second said machining or both first said machining and second said machining creates one or more faceplate portions of said truss structure.

26. The method of claim 25, wherein said truss structure comprises one or more sandwich structures.

27. The method of claim 23, wherein said monolithic sample comprises at least one select material, wherein said select material comprises:
at least one of ceramic, polymer, metal, metal alloy, or composites thereof.

28. The method of claim 23, wherein said machining of said monolithic sample comprises at least one of the following processes:
electro discharge machining, punching, drilling including laser drilling and other ablative removal techniques in which material is melted or evaporated, water jet cutting, or chemical dissolution methods.

29. The method of claim 23, wherein at least one of said truss unit portions have a geometrical shape of at least one of:
tetrahedral, pyramidal, Kagome, cone, frustum, or combinations thereof.

30. The method of claim 23, wherein at least one of said first path and said second path are curved.

31. The method of claim 23, wherein said monolithic sample is machined along a plurality of paths.

32. The method of claim 25, wherein said facesheet portions and said truss unit portions intersect an interface region is defined and wherein said interface region has the same metallurgical and microstructural properties.

33. The method of claim 23, wherein said truss unit portions are created without any joining.

34. The method of claim 23, wherein said truss unit portions are created without any of the following methods:
bonding, adhesives, diffusion bonding, brazing, soldering, or resistance/electron/laser welding, coupling.

35. The method of claim 25, wherein said truss unit portions and facesheet are formed without any joining.

36. The method of claim 25, wherein said truss unit portions are created without any of the following methods:
bonding, adhesives, diffusion bonding, brazing, soldering, or resistance/electron/laser welding, coupling.

37. The method of claim 23, wherein said monolithic sample comprises at least one of the following:
sheet, plate, ingot, billet, powder compact, slurry.

38. The method of claim 23, wherein said truss unit portions having nodes wherein said nodes have the same metallurgical and microstructural properties as said truss unit portions.

39. The method of claim 25, wherein said truss unit portions having nodes wherein said nodes have the same metallurgical and microstructural properties as said truss unit portions and said facesheet portions.

40. The method of claim 23, wherein truss units created by first said machining or second said machining or both first said machining and second said machining may have varying relative density with respect to each other.

41. The method of claim 26, wherein said one or more sandwich structures provide blast impact mitigation.

42. The method of claim 26, further comprising inserts and filler material disposed between said one or more face sheets, wherein said one or more sandwich structures provide projectile arresting capability.

43. The method of claim 26, wherein said one or more sandwich structures are laterally in communication with one another.

44. The method of claim 43, wherein said communication comprises at least one of the following:
bonding, adhesives, diffusion bonding, brazing, soldering, or resistance/electron/laser welding, coupling.

* * * * *

UNITED STATES PATENT AND TRADEMARK OFFICE
CERTIFICATE OF CORRECTION

| | | |
|---|---|---|
| PATENT NO. | : 8,176,635 B2 | Page 1 of 1 |
| APPLICATION NO. | : 12/447166 | |
| DATED | : May 15, 2012 | |
| INVENTOR(S) | : Douglas T. Queheillalt and Haydn N. G. Wadley | |

It is certified that error appears in the above-identified patent and that said Letters Patent is hereby corrected as shown below:

Title Page;

Item no. (74), Attorney, Agent, or Firm on the face of the patent, please add --Robert J. Decker--.

Signed and Sealed this
Third Day of July, 2012

David J. Kappos
*Director of the United States Patent and Trademark Office*